UNITED STATES PATENT OFFICE.

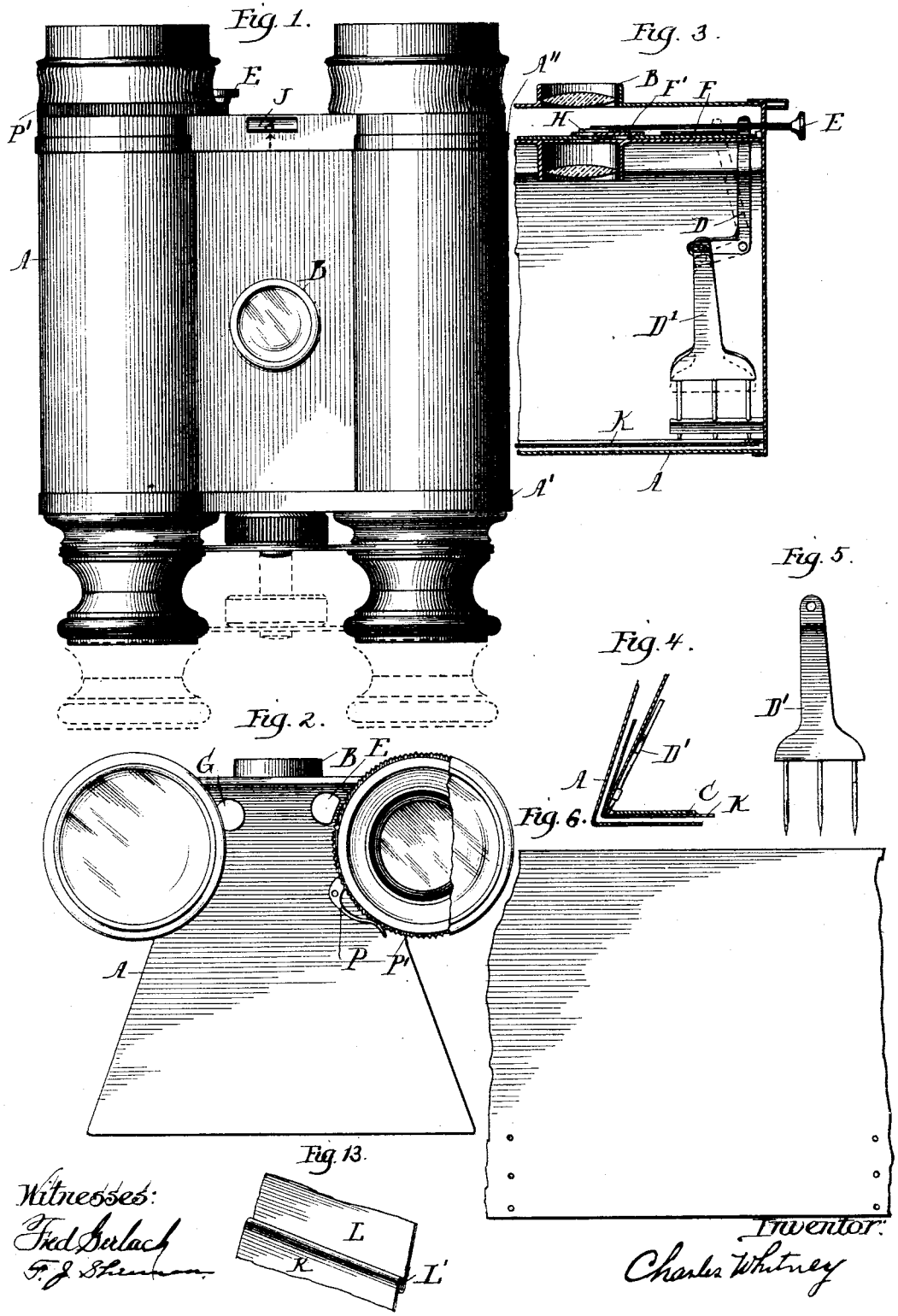

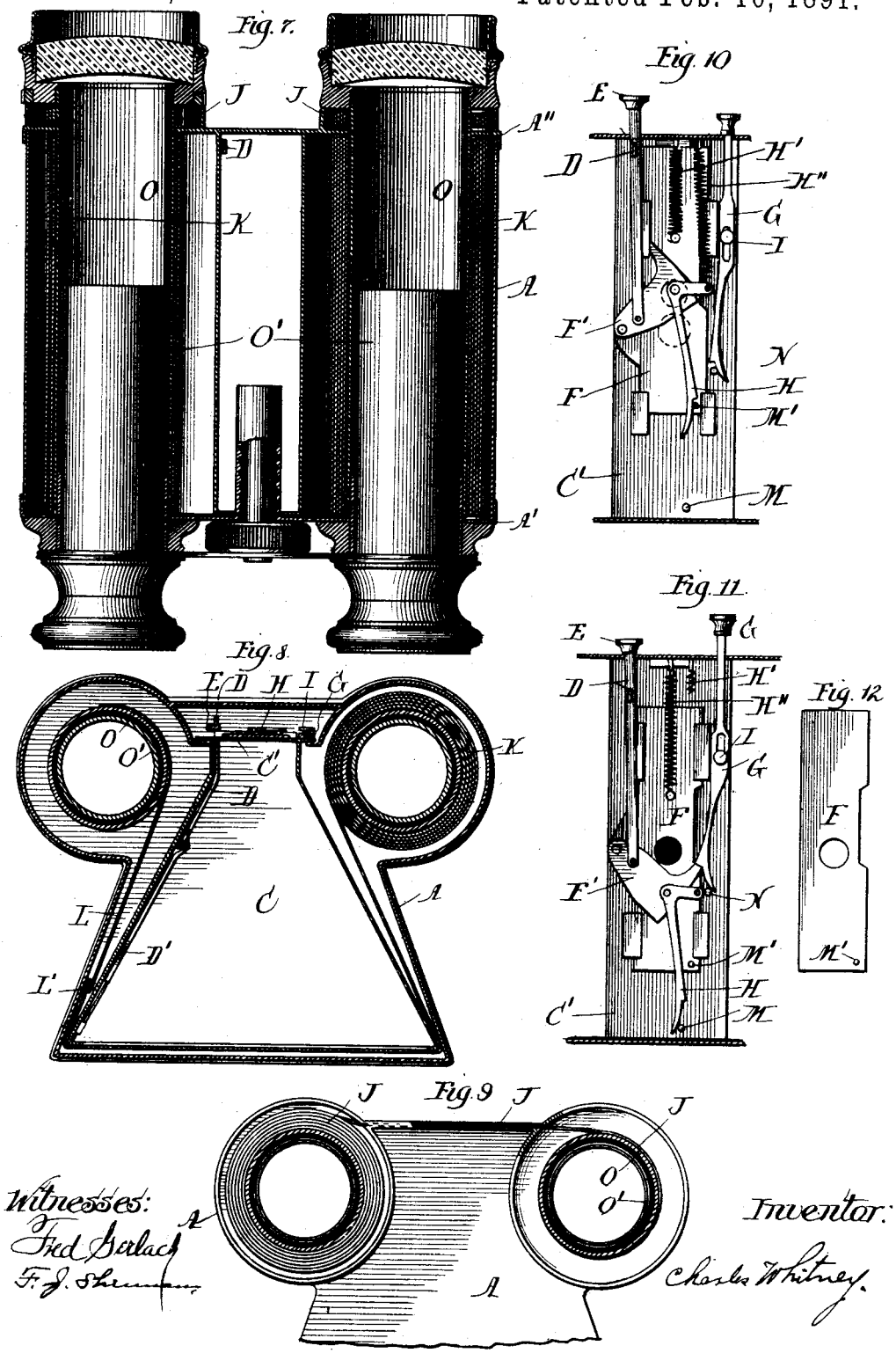

CHARLES WHITNEY, OF CHICAGO, ILLINOIS.

PHOTOGRAPHIC CAMERA.

SPECIFICATION forming part of Letters Patent No. 446,374, dated February 10, 1891.

Application filed July 2, 1890. Serial No. 357,551. (No model.)

*To all whom it may concern:*

Be it known that I, CHARLES WHITNEY, a citizen of the United States, residing at Chicago, in the county of Cook and State of Illinois, have invented new and useful Improvements in Photographic Cameras, of which the following is a specification.

My invention relates to improvements in photographic cameras in which a roll of negative-plates in ribbon form is used; and the object of my improvements are to provide means for marking the roll for each exposure and means for measuring the amount required for each exposure; also, to provide a more perfect shutter for time and instantaneous work, and, further, in providing a compact and combined camera and field-glass. I attain these objects by the mechanism illustrated in the accompanying drawings, in which—

Figure 1 is a front view. Fig. 2 is an end view. Figs. 3, 4, 5, 9, 10, 11, 12, and 13 are detail views. Fig. 6 is a section of the negative-ribbon, showing perforations. Figs. 7 and 8 are cross-sectional views.

Similar letters refer to similar parts throughout the several views, in which—

A is the outside case or camera-box, and in shape is partly circular and partly angular, and may be made of any suitable well-known material.

B is the lens-opening.

C is the inner compartment through which the exposure is made.

C' is the front end of inner compartment C, upon which the shutter is mounted.

D is a bell-crank lever connected to shutter-lever E, and D' is a link with the perforating-points attached.

F is the sliding shutter-plate, and F' is the oscillating cover-plate.

G is a time-stop lever.

H is a latch for engaging with a pin on shutter F.

H' and H" are springs for operating the shutter and the shutter-cover.

I is a stud supporting the time-stop lever G.

J is the measuring-tape.

K is the negative-plates in ribbon form.

L is a connecting-strap, and L' is the seam-connection of the negative-ribbon and strap.

M is a trip-pin to shutter-latch, and M' is a latch-pin.

N is a trip-pin for the time-stop.

O is the outside telescopic tube, and O' the inside tube of the field-glass.

P is the dog, and P' is the ratchet for stopping the winding-cylinder.

I have shown a similar arrangement of the field-glasses in a photographic camera in my application now pending, the Serial number of the same being 321,421. Therefore I will describe herein more particularly the features of this application not shown in my previous application.

In the arrangement of the spools to form a winding-post and a supply-post I have adapted the outside telescopic tubes of my field-glass for that purpose, and this arrangement may be seen the plainest in Fig. 8 of the drawings, which is a cross-sectional view. The negative-ribbon K is carried from the supply-coil around the base of compartment C, which is open for the exposure, the light being admitted from the lens, which is located between the spools at the opposite side, and the loose end of the ribbon is placed into the seam-lap L' and folded down. In this way it is held securely, and by the use of the extension-strap L the usual waste of negative-ribbon, where connection is made direct to the winding-post, is avoided at the upper end of the winding-post and the supply-post. A cup-shaped compartment is shown, through which the tubes O pass, around one of which is placed the tape J, and the outer end is made fast to the winding-post, as shown in Fig. 9 of the drawings, and in cross-section, Fig. 7; also, in Fig. 1 is shown a short section. This tape is spaced and numbered, and in thickness is made to correspond with the thickness and the size of the negative-ribbon for exposure. The winding-post increasing in size as each exposure is wound up, it will be seen that there is a corresponding increase where the tape is being wound. Therefore I space the tape in equal distances for the size of each exposure and place numbers so that an account may be kept of the number and style of exposures made. On the tube used as a winding-post I place a ratchet wheel and dog for preventing a backward or wrong movement of the winding-post. (Shown in Fig. 2 of the drawings.) The tape may be made of any well-known material suitable for the purpose.

The marking or puncturing device is operated by the pressure on the shutter-lever through the bell-crank lever D and the bar D', and consists of one or more needles, as shown in Figs. 3 and 5. The marking for each exposure is very essential, as the operator, or the one developing the negatives, is thus enabled to cut them apart at the proper places, and the puncturing device being operated through the operation of making each exposure, it is always done at the right time and place. The shutter-plate F is a sliding plate with a perforation in the center for the exposing-aperture and notched on one side for engaging the time-stop. It is held in one direction by the spring H'', and while the oscillating cover-board is covering the hole in the shutter-plate, the latch H engaging pin M', a pressure on the rod E carries the shutter-opening thus covered past the lens-opening and brings latch H in contact with trip-pin M, where it is unlatched by the pressure on rod E and stop-pin N and the shutter-plate F, moved rapidly back by the tension of spring H'. The hole in the shutter-plate, being uncovered in its return movement as it passes the lens-opening, makes what is termed an "instantaneous exposure." Should a time exposure be required, the operator before pressing on rod E will draw out rod G, which previous to being drawn is held out of connection with the shutter and cover plate by pin N, and owing to the spring-pressure at this end of rod G and to the cam-shape point it is permitted to drop into the notch in the shutter-plate, which also brings it in contact with the projection on the oscillating cover-board. This time-stop engagement takes place after the required pressure has been applied to rod E. After the required time for exposure has been given the rod G is pressed down and thus disengaged, permitting the shutter-plate and cover-board to return by the strain of springs H' and H'', as shown in Fig. 10 of the drawings.

In Fig. 11 is shown the position of the shutter-posts for time exposure. It will be seen that in this arrangement of shutter devices I am enabled to make exposures by simply pressing on the rod E, the oscillating cover-board through the pressure on the rod E and the strain of the spring H'' being adapted to cover the shutter-hole as it is passing the lens-opening and engage with and carry the shutter-plate F, the shutter F being adapted for covering the lens-opening both before and after each exposure.

The outside case A is made fast or stationary with the end cover A', and the end cover A'', to which compartment C is attached, is made attachable and detachable and held in place by catches. (Not shown.)

In filling and operating my camera I take off the cover A'', which has compartment C and the outside tubes of the field-glass connected thereto, and place a coil of properly-sensitized negative-ribbon around one of the tubes, loosely bringing the outside end of the ribbon around the base of compartment C, and make the connection to strap L, as shown at L' in Fig. 8 of the drawings. Strap L being connected to the winding-tube, it will be seen that turning this tube, which is done by taking hold of knob or object-glass holder connected to the outer end of the tube, will draw the ribbon from the supply-coil. In this position the first or No. 1 plate is in position for exposure, and the designating-tape is correspondingly placed around the outside end of one tube and connected to the winding-tube, with figure "1" in place of figure "3," as seen in Fig. 1 of the drawings, the outside case A being placed back, covering the compartment C, thus making two light-tight compartments, one for the exposure and one for the supply-coil and winding-coil. Being now ready for making an exposure, point the lens toward the object which you wish to photograph and press on the rod E until you hear the click of the shutter, and exposure No. 1 is made. Now turn the knob on the outer end of the winding-tube until the figure "2" on the measuring-tape appears at the point designated by the dart in Fig. 1 of the drawings, and the second or No. 2 plate is in position for exposure, and when the pressure is made on shutter-rod E for the second exposure the marking-points will perforate the ribbon between No. 1 and No. 2 exposures. In the drawings I shown but three perforations; but this may extend to any number across the whole width of the ribbon, if desired.

Deeming this a sufficient description of my improvements, what I claim is—

1. In a photographic camera, a measuring-tape adapted for indicating the position of the negative-ribbon, in combination with a binocular telescope or field-glass, the outside cylinders of which are adapted to wind the negative-ribbon and the tape, substantially as described.

2. In a photographic camera, the indicating-tape and the winding-posts, in combination with the negative-ribbon and a puncturing device, the latter adapted to be operated by the shutter-lever, substantially as described.

3. In a photographic camera, an indicating-tape adapted to travel in unison with the negative-ribbon, in combination with the cup-shaped compartments and the negative-ribbon compartments, substantially as described.

4. In a photographic camera adapted for the use of negatives in ribbon form, a puncturing device adapted to operate by the movement of the shutter-controlling rod, substantially as described.

5. In a photographic camera, the combination of the coil of negative-ribbon, the puncturing-needles, and the designating-tape, substantially as described.

6. In a photographic camera adapted for using negative-plates in ribbon form, the combination of the tape J, a puncturing device, and the connecting-strap L, substantially as described.

7. In a photographic camera, the combination of a sliding shutter-plate and a pivoted oscillating shutter-plate cover, said cover adapted to engage the shutter-plate and cover its aperture while said aperture passes the lens-opening, substantially as described.

8. In a photographic camera, a sliding shutter-plate, in combination with a pivoted oscillating cover-plate latched thereto, said cover-plate adapted to disengage said shutter-plate by pressure on the controlling-rod F and to re-engage said shutter-plate by spring H'', substantially as described.

9. In a photographic camera, the storage-compartments for negative-ribbon, adapted to encircle the tubes of a binocular telescope or field-glass, in combination with a measuring device and a perforating device, substantially as described.

10. In a photographic camera, the combination of a straight sliding shutter-plate and a pivoted oscillating cover-plate and means for latching them together and unlatching them, substantially as described.

11. In a photographic camera, the combination as follows: a winding-post, a connecting-strap, a perforator, and a designating-tape, substantially as described.

12. In a photographic camera, the combination of a ratchet wheel and pawl, with the telescopic cylinder of a field-glass adapted for use both as a winding-post and a field-glass, substantially as described.

CHARLES WHITNEY.

Witnesses:
O. W. BOND,
JNO. C. MACGREGOR.